United States Patent [19]
Venier et al.

[11] Patent Number: 5,583,926
[45] Date of Patent: Dec. 10, 1996

[54] METHOD AND APPARATUS FOR ROUTING A CALL TO A NUMBER CORRESPONDING TO A VIRTUAL PUBLIC DIAL PLAN OR TO AN EXISTING DIAL PLAN

[75] Inventors: Daniel J. Venier; L. Lloyd Williams; R. William Carkner, all of Kanata; Morlen R. Reynolds, Sarsfield, all of Canada

[73] Assignee: Stentor Resource Centre Inc., Ottawa, Canada

[21] Appl. No.: 366,650

[22] Filed: Dec. 30, 1994

[51] Int. Cl.$^6$ .................................................. H04M 3/42
[52] U.S. Cl. ..................... 379/207; 379/220; 379/201; 379/229
[58] Field of Search ..................... 379/201, 219, 379/220, 221, 207, 211, 225, 216

[56] References Cited

U.S. PATENT DOCUMENTS

| | | | |
|---|---|---|---|
| 3,600,522 | 8/1971 | Benson | 379/208 |
| 3,692,946 | 9/1972 | Budrys et al. | 379/196 |
| 3,975,595 | 8/1976 | Berube et al. | 379/216 |
| 4,600,812 | 7/1986 | Gerlits | 340/827 |
| 4,748,661 | 5/1988 | Edelstein et al. | 379/289 |
| 4,756,019 | 7/1988 | Szybicki | 379/112 |
| 4,831,649 | 5/1989 | Mejane | 379/111 |
| 4,882,699 | 11/1989 | Evensen | 379/284 |
| 5,182,766 | 1/1993 | Garland | 379/216 |
| 5,204,894 | 4/1993 | Darden | 379/88 |
| 5,237,604 | 8/1993 | Ryan | 379/220 |
| 5,272,749 | 12/1993 | Masek | 379/216 |
| 5,285,494 | 2/1994 | Sprecher et al. | 379/59 |
| 5,289,536 | 2/1994 | Hokari | 379/221 |
| 5,311,572 | 5/1994 | Friedes et al. | 379/67 |
| 5,329,578 | 7/1994 | Brennan et al. | 379/67 |
| 5,333,188 | 7/1994 | Bogart et al. | 379/220 |
| 5,339,356 | 8/1994 | Ishii | 379/220 |
| 5,343,517 | 8/1994 | Bogart et al. | 379/220 |
| 5,359,651 | 10/1994 | Draganoff | 379/354 |
| 5,363,437 | 11/1994 | Shen et al. | 379/355 |
| 5,375,167 | 12/1994 | Bales et al. | 379/219 |
| 5,404,395 | 4/1995 | Bogart et al. | 379/201 |
| 5,455,855 | 10/1995 | Hokari | 379/220 |

FOREIGN PATENT DOCUMENTS

| | | | |
|---|---|---|---|
| 0143660 | 8/1983 | Japan | H04M 3/44 |
| 0037861 | 2/1990 | Japan | H04M 1/274 |
| 0094740 | 4/1990 | Japan | H04M 1/27 |
| 0278952 | 11/1990 | Japan | H04M 3/42 |
| 5160918 | 6/1993 | Japan | H04M 11/00 |
| 5-268357 | 10/1993 | Japan | H04M 3/44 |
| 5-327908 | 12/1993 | Japan | H04M 3/44 |
| 6030132 | 2/1994 | Japan | H04M 3/44 |
| 6-113020 | 4/1994 | Japan | H04M 3/44 |

OTHER PUBLICATIONS

Impacts on the SS-7 Signaling Network, B. Baldwin, Oct. 24, 1994 Number Portability Workshop.

(List continued on next page.)

*Primary Examiner*—Krista M. Zele
*Assistant Examiner*—Scott Wolinsky
*Attorney, Agent, or Firm*—Foley & Lardner

[57] ABSTRACT

A method for creating a virtual public numbering domain, which will coexist with and be parallel and non-intrusive to the existing geographic North American telephone network numbering plan is disclosed. It will have sufficient capacity to provide additional and more flexible numbering resources which will stimulate and enable many new service applications. The existing telephone network infrastructure has digital switching points and a database system. The method consists of receiving at one of the digital switching points a called number, and verifying whether the number called is a number of the virtual public dial plan. If the number called is a number of the virtual public dial plan, the next steps consist of forming with the number called a virtual public address of predetermined length, supplying the virtual public address to the database system to determine a corresponding network node address, supplying the corresponding network node address to the digital switching point and routing the call through the network infrastructure according to the existing dial plan. If the number called is a number of the existing dial plan, the call is routed through the network infrastructure according to the existing dial plan and the number called.

33 Claims, 14 Drawing Sheets

OTHER PUBLICATIONS

New Short Selector Processor for Telephone Systems—Source Publ: Radio Elektronik Schau vol. 52, No. 9, p. 53, 1976 Publisher: Technischer Verlag Erb. Ges.m.b.H. A1061 Wien, Mariahilfer Strasse 71, Postfach 101, Austria.

IILC Issue ESPR–036—Local Calling Area Abbreviated Dialing Access to Information and Enhanced Services.

Recommendations for #XXX Abbreviated Dialing Plan Source: Bellsouth Telecommunications, Inc. Date: Jun. 1, 1994 3535 Colonnade Parkway, Birmingham, Alabama 35243, U.S.A.

Local Area Number Portability (LANP) (An AIN 0.1 Database Service) Date: Aug. 23, 1994; Source: Electric Lightwave, Inc. Address: 8100 NE Parkway Dr. Vancouver, WA 98662.

Local Area Number Portability (LANP) (An AIN 0.1 Database Service) Second Contribution—Source: Electric Lightwave, Inc. 8100 NE Parkway Dr. Vancouver, WA 98662. Date: Sep. 20, 1994.

METHOD AND APPARATUS FOR ROUTING A CALL TO A NUMBER CORRESPONDING TO A VIRTUAL PUBLIC DIAL PLAN OR TO AN EXISTING DIAL PLAN

BACKGROUND OF THE INVENTION a) Field of the Invention

The present invention is concerned with a method and apparatus used to create a virtual public numbering domain, which will coexist with and be parallel and non-intrusive to the existing geographic North American telephone network numbering plan.

b) Brief Description of the Related Art

Network facilitators have been unsuccessfully researching options for delivering a service where telephone numbers are not fled to equipment locations. For instance, in the existing network, each phone subscriber has a number in the NXX-NXX-XXXX format, where N represents a digit from 2–9 and X represents a digit from 0–9. The first group of three digits indicate the area code or NPA of the subscriber, the second group of three digits indicate a switching exchange or service switching point to which the subscriber is connected to, and the last group of four digits indicate the address of the subscriber within the service switching point.

Two telephone service applications of separating dialing from physical routing address are Local Area Portability and Abbreviated Dialing applications.

The Industry Numbering Committee (INC) 9 and 10 Number Portability workshops have studied the Local Area Portability application and received a submission from Electric Lightwave Inc. (ELI) in their document entitled "Local Area Number Portability (LANP) (an AIN 0.1 database service), by Sherman L. Ackley. It describes a new approach to number portability wig a metropolitain area using the Adavanced Intelligent Network 0.1 capabilities. This document was prepared to introduce the industry to the concept of implementing number portability on a metropolitan area basis, without affecting call routing by switches external to the LANP metropolitain area. The LANP precludes the availability to a caller of both direct North American Numbering Plan (NANP) dialling and Virtual Dialling by use of an explicit dialing code (the # key will be used throughout as an example of an explicity dialling code). Secondly, the ELI submission necessitates the overnight cutover of the entire exchange or metropolitan area, and the customer addresses must still adhere to the inflexible numbering format. Finally, the ELI approach forces all calls to query a database, which is impractical based on current network and database capacities.

The Information Industry Liaison Committe (IILC) is considering the Abbreviated Dialing application in its issue ESPR-036 entitled "Local calling area abbreviated dialing access to information and enhanced services", and has studied different possibilities with the objective being the ability for telcos to offer abbreviated or shortened dialling sequences within a local calling area. This committee agreed that the following four abbreviated dialling formats appeared more feasible from a technical and marketing standpoint: #XXX, #XXXX, NXX# and NXXX#, where # represents a symbol key on the telephone set, X represents digits 0 through 9, and N represents digits 2 through 9. This committee could not conclude on a method to provide the abbreviated dialling functionality but agreed that AIN developments should be planned to include functions to provide this service capability in AIN Release 1 (Subset 0.1 and 0.2) Their proposed dialling format is constrained to 10 000 possible subscribers and is limited to abbreviated dialing only.

BellSouth Telecommunications has contributed to the INC discussion on abbreviated dialing with their submission entitled "Recommendation of #XXX as a national abbreviated dialling plan" of Jun. 1, 1994. In this document, Bell South Telecommunications reviews the results of the Information Industry Liaison Committee (IILC) ESPR-036 and supports the use of #XXX with expansion to #XXXX as a national abbreviated dialing plan and further suggests that #XXX should be segmented into national and non-national numbers and administered by a single administrator. This document does not give any indication as to the method proposed to provide this abbreviated dialling plan or whether it could be made possible on the existing network. No introduction of a virtual address space was made or considered.

Also known in the art are special triggers for Advanced Intelligent Network (AIN) and any similar network. These triggers are divided in two classes: subscribed or originating triggers (which launch a query based on the callers phone number) and dialed or office triggers (which launch a query based on the dialed digits).

One trigger, known as the Customized Dial Plan trigger allows special dialling options to a subscriber or a group of subscribers known as a customer group (for example, 4-digit dialling within the company or group). This subscribed trigger is based on the calling number, and any special muting or service features is a function of the caller. This trigger is not practical for implementation of a public virtual dial plan because treatment of the call in the SCP must key on the calling number and thus service instructions would have to be present on the SCP for all possible callers rather than once for the dialed virtual address.

Another trigger is the Dialed Number (DN) trigger, which generalizes an 800 function so that any dialled number could launch a query rather than just 800 numbers. The trigger number is loaded on a single switch and the number format must conform to the existing NANP. The trigger is invoked when a call to that DN number arrives at the Service Switching Point (SSP) where a query is then lauched to the Service Control Point (SCP) for service handling. However adherence to the geographic routing plan is required, since the network must know to which exchange to route to based on area code and NXX exchange.

A third trigger is the public office dial plan (PODP), which is an office based trigger (query based on dialed digits but query launched from originating SSP). Because this trigger is loaded at the originating SSP, it is intended to be used by choosing ranges in the SSP for which queries are launched (it is generally understood that SCPs do not have the capacity to handle queries on all calls in an SSP). For instance, all 555-XXXX numbers could be sent to the SSP for treatment and thus the trigger is "Public". Somehow, all dialed ranges have to generate an SCP query.

SUMMARY OF THE INVENTION

It is therefore an object of the present invention to provide a method for creating a parallel, non-intrusive public numbering domain, coexisting with the existing network node address numbering plan, with sufficient capacity to provide a virtual dial plan exceeding the existing network node address numbering plan. This method does not require replacement of the existing equipment and further development. The present object is achieved by a method of routing a call to a number corresponding either to a virtual public dial plan or to an existing dial plan through an existing telephone network infrastructure having digital switching points and a database system. The method comprises the steps of:

a) receiving at one of the digital switching points a number called;

b) verifying whether said number called in step (a) is a number of the virtual public dial plan and if said number called is a number of the virtual public dial plan:

i) forming with the number called in step (a) a virtual public address of predetermined length;

ii) supplying said virtual public address of step (i) to said database system to determine a corresponding network node address; and iii) supplying said corresponding network node address to the digital switching point of step (a), and routing said call through said network infrastructure according to the existing dial plan;

or else:

routing said call through said network infrastructure according to the existing dial plan and the number called.

The abovementionned object is also achieved with an apparatus for routing a call to a number corresponding either to a virtual public dial plan or to an existing dial plan through an existing telephone network infrastructure having digital switching points mid a database system. The apparatus comprises:

receiving means for receiving at one of the digital switching points a number called;

verifying means for verifying whether the number called received by said receiving means is a number of the virtual public dial plan;

forming means for forming with the number called a virtual public address of predetermined length;

first supplying means for supplying said virtual public address to said database system;

determining means for determining a corresponding network node address;

second supplying means for supplying said corresponding network node address to said digital switching point; through said network infrastructure according to the existing dial plan routing means for routing said call to said corresponding network node address through said network infrastructure according to the existing dial plan if the number called is from the virtual public dial plan or to the number called according to the existing dial plan if the number called is from the existing dial plan.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein.

In the following description and the drawings, the same reference numerals will refer to the same structural elements.

DESCRIPTION OF PREFERRED EMBODIMENTS

Figure 1:
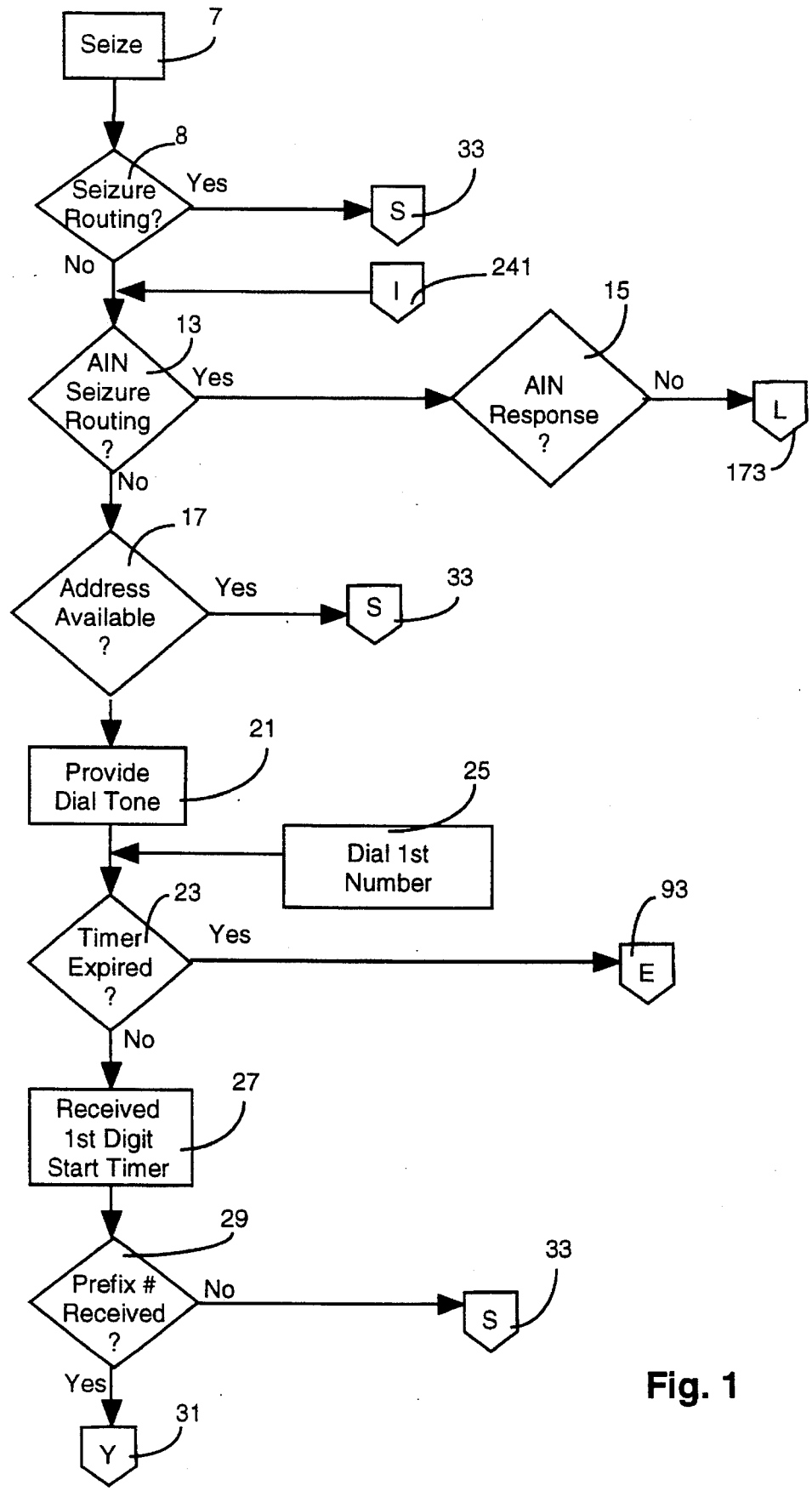
FIG. 1 is a flow diagram of a method for routing a call to a number corresponding either to a virtual public dial plan or to an exising dial plan through an exisiting telephone network infrastructure according to the present invention.

In order to lighten the following description, the following acronyms will be used:

AIN: Advanced Intelligent Network;
AIN CCIS: SS7 network signalling;
AIN PODP: AIN Public Office Dial Plan;
AIN SCP: AIN Service Control Point;
CLID: Calling Line Identification;
CNA: Customer Number Address;
DTMF: Dual Tone Multifrequency;
ISCP: AIN Database;
ISDN: Integrated Services Digit. Network;
ISUP: ISDN User Port;
NANP: North American Numbering Plan;
NNA: Network Node Address;
PSTN: Public Switching Telephone Network;
SCP: Signalling Control Point;
SPCS: Service Program Control Switch;
SSP: Service Switching Point;
STP: Signalling Transfer Point;
TCAP: Transaction Capabilities Application Part.

In the following description, "subscriber" refers to an owner of a number called, "caller" refers to a user calling a number, "existing dial plan" refers to the North American Numbering Plan (NANP) or any similar dial plan and "virtual public dial plan" (VPDP) refers to a dial plan in which numbers are not tied to the exisiting network infrastructure, available universally to all telephones, and functioning in parallel with the existing dial plan, a "virtual public number" is a valid dialing sequence in the VPDP, a "virtual public address" is an address of predetermined length formed from a virtual public number, VPDP Access Code is a predetermined prefix code used to drive the call toward an AIN PODP Trigger (# is used as an example of a VPDP Access Code for the remainder of this document).

FIGS. 1 to 12 show a first preferred embodiment of the method for routing a call to a number corresponding to either a virtual public dial plan or to an existing dial plan through an existing telephone network infrastructure. The existing telephone network infrastructure has digital switching points 312, SSP or the stone, and a database system 315 which could consist for example of an AIN SCP or the same. The first step of the method consists in receiving at one of the digital switching points a number called. Then, a test is performed to verifying whether the number received in the first step is a number of the virtual public dial plan, and if the number received is a number of the virtual public dial plan, the following steps are performed:

i) forming with the number received in the first step a virtual public address of predetermined length;

ii) supplying the virtual public address of step (i) to the database system to determine a corresponding network node address; and iii) supplying the corresponding network node address to the digital switching point of step (a), and routing the call through the network infrastructure according to the existing dial plan;

or else:

routing the call through the network infrastructure according to the existing dial plan told the number called.

More particularily, the test of verifying the number received after its reception consists in verifying whether the number received in the first step is preceeded by a VPDP Access Code. In a preferable way, the VPDP Access Code is a character that is not used in the NANP, such as the pound sign of a telephone keypad. Of course, combinations of two or several characters representing a VPDP Access Code are also possible, but # is the most suitable VPDP Access Code for the NANP.

The step (i) more particularly consists in forming a virtual public address in a unique 10 digits number that is not a valid 10 digits number in the existing dial plan.

The step (iii) may further comprise steps of generating an audible message describing at least one code access, and verifying whether a code access is selected, and if a code access is selected, adding the selected code access to the virtual public address at a predetermined position. The axle access is a service whereby a caller can reach a subscriber by dialling its virtual public number in the virtual public dial plan and appending a code to the end of the dialling sequence, which would allow differentiation for example of a home number, a car number, a fax number, a modem number, a pager number or an office number. For example, a caller dialling #6137811314F, which is a virtual public number, would reach the fax machine of the subscriber with the virtual public number of 6137811314. For this service, the subscriber would be allowed to customize his/her code acces.

As shown on FIG. 1, which shows a generic call flow for SSP with AIN connectivity, the method further comprises all the steps generally carried out by existing telephone networks such as PSTN. These further steps consists in detecting when a caller lifts handset, which provides a seizure indication 7 to the digital switching point 312. From this seizure indication 7, a verification 8 of whether the seizure indication is present or not, and if it is present, it directs the call to a predetermined number and enters an S condition 33, leaving the caller without an opportunity to input a number. If the seizure indication is not present, an AIN seizure routing verification 13 based on line information is performed. If routing information is not passed back to the SSP, which corresponds to a negative answer 15, a L condition 73 is entered, otherwise the routing information is passed back to the SSP and a subsequent verification is performed. This subsequent verification consists in verifying whether an address is available 17. If the ISCP returns a routing address, the call will default straight to the S condition 33, shown on FIG. 6, otherwise, a dial tone will be provided 21. As well known in the art, the dial tone is used to give an audible indication to the caller to start inputting the number to be reached.

As the dial tone is activated, a first digit timer associated with the receipt of a first digit is started 23. If the caller dials 25 a first digit before the first digit timer has expired, the first digit timer will be stopped and an interdigital timer started 27. This interdigital timer will be restarted between each digit. If the caller did not dial a first digit within the allowed period of time, an E condition 93 is entered. Usually, the interdigital timer is shorter than the first digit timer.

From the moment a first digit is dialed 25, a test 29 is applied onto it to verify whether the digit dialed is the #. When the first digit received at the SSP is #, the call will be directed to a condition Y 31, shown on FIG. 2, otherwise, the dialled digits will be routed using existing dial plan, as described by condition S 33.

Figure 3:
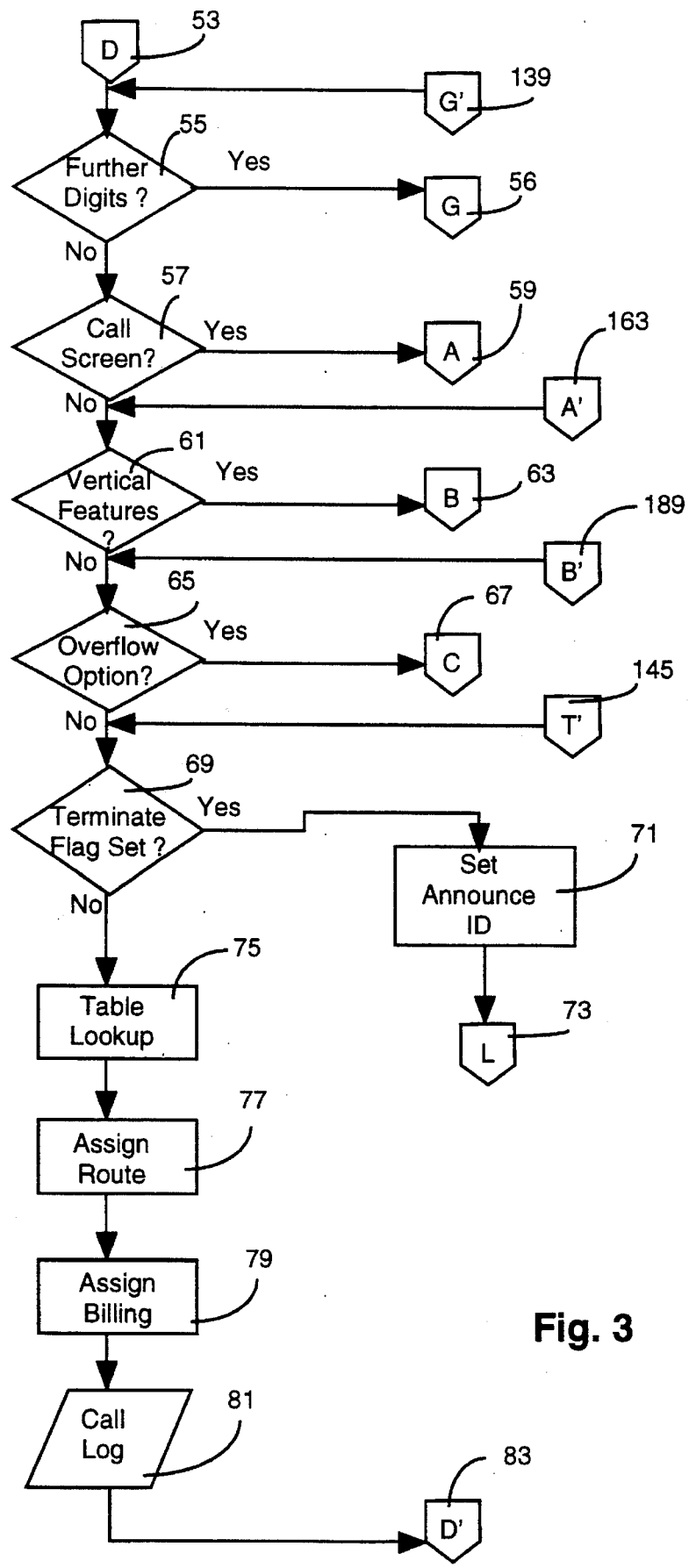
FIG. 3 is a flow diagram of a D condition of the method of FIG. 1, according to the present invention.

As shown on FIG. 3, the next step, when the first dialled digit is # is to prepare 35 for the next digit. The interdigital timer will be started 37, while waiting for the next digit in the sequence. If the second digit is not received, the call will still be allowed to priced, providing other options for continued routing exist. If a next digit is dialled 39 before the interdigital timer has expired 41, the interdigital timer is resetted and a next digit is awaited. Another test for the verification of the digits dialled could also be provided. This test would consist of verifying whether an end of digits indicator has been pressed. The presence of such an indicator could allow SSP software to bypass the wait state associated with the interdigital timer for the dialing sequence.

Once either the interdigital timer has expired or an end of digits indicator has been pressed, an additional verification could be performed for recognizing and isolating "##" calls 45 which are utilized by certain vendors for last number redial, so that they would not be treated as virtual public numbers. Upon detection of "##", the call could be routed using standard translations of the existing dial plan, S condition 33, or be forwarded to the ISCP for recall determination.

Once all the previous verifications have been performed for identifying virtual public numbers, # drives the call toward an AIN BODP trigger using telephone exhange translations, this step being called exchange routing 47 on the flowdiagram. Prior to the AIN PODP trigger detection point, # is deleted such that only the NANP dial plan information is used for the AIN PODP trigger. The # could also be incorporated in the TCAP query message.

The further step consists in preparing a TCAP query 49. This TCAP query may include for example CLID, diddled digits, and many other informations. Once the TCAP query has been generated, a timer is required to assess the ISCP responsiveness, so a query timer is started 51. Contingency options may be put in place where a response is not returned from the ISCP within the expected period.

Then a routine for allowing inputting of a code access is generated, as shown on FIG. 3 condition D 53. This is the entry point where the TCAB query arrives at the SCP. The key field which contains a representation of the dialled digits points to the custom service logic to be executed for the owner of the service.

For some features, it will be necessary to prompt the caller for additional digits. If those features apply to this call, the SCP will respond to the SSP with a control message indicating an announcement to play and a number of digits to collect, represented on the diagram of FIG. 3 by "Further digits?" 55. If further digits are required, condition G 57 is entered and the corresponding steps shown on FIG. 6 will be performed. Condition G 57 causes SSP to generate a TCAP with the additional digits requested.

Figure 7:
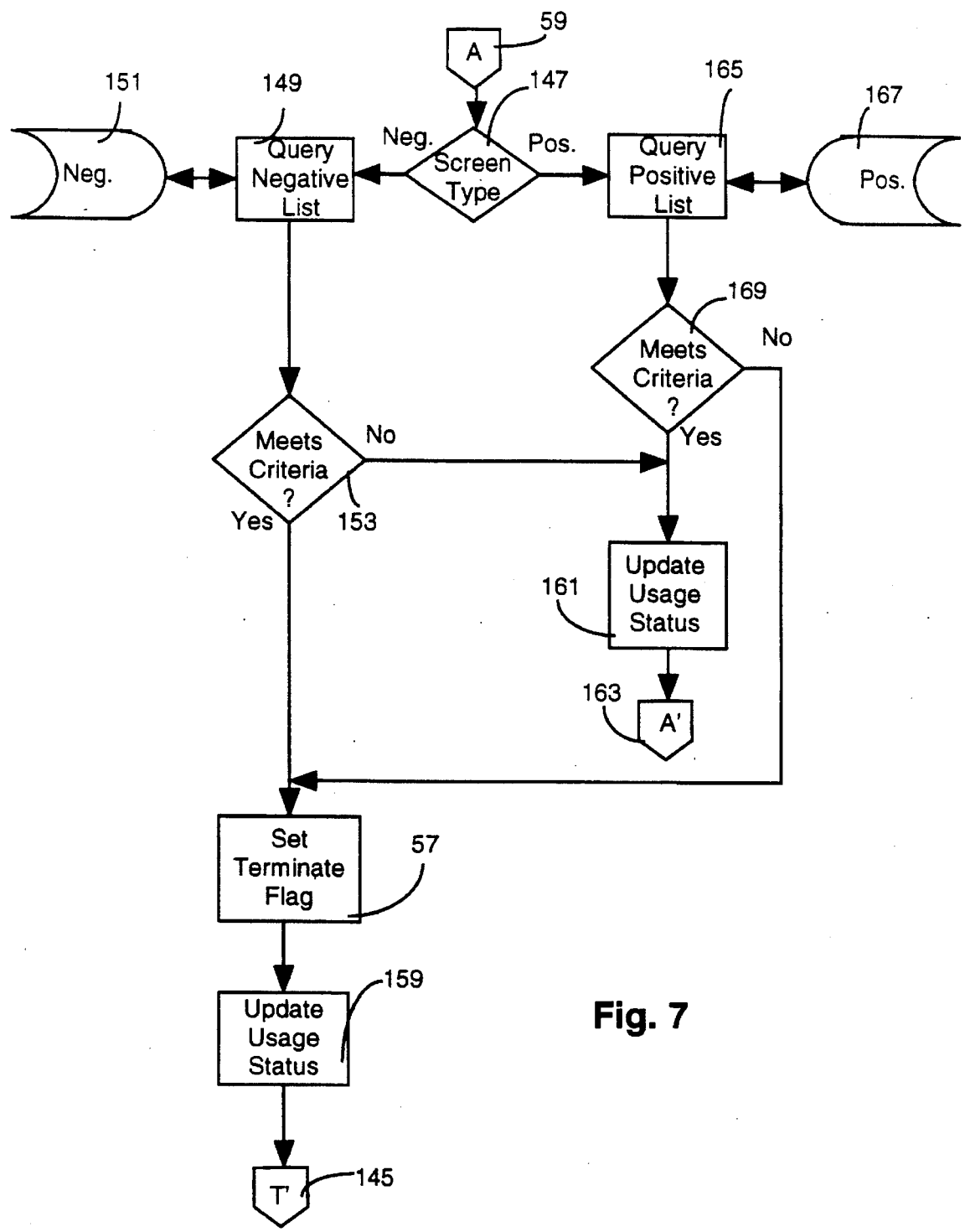
FIG. 7 is a flow diagram of an A condition of the method of FIG. 1, according to the present invention.

The method may include verifying for a positive or negative call screening features 57, positive implying that the subscriber provides a list of allowable callers, and negative implies that the subscriber provides a list of callers not to be accepted. If a call screening feature 57 is present, an A condition 59 shown on FIG. 7 is entered. The A condition 59 performs the call screening logic according to the subscriber features.

Figure 6:
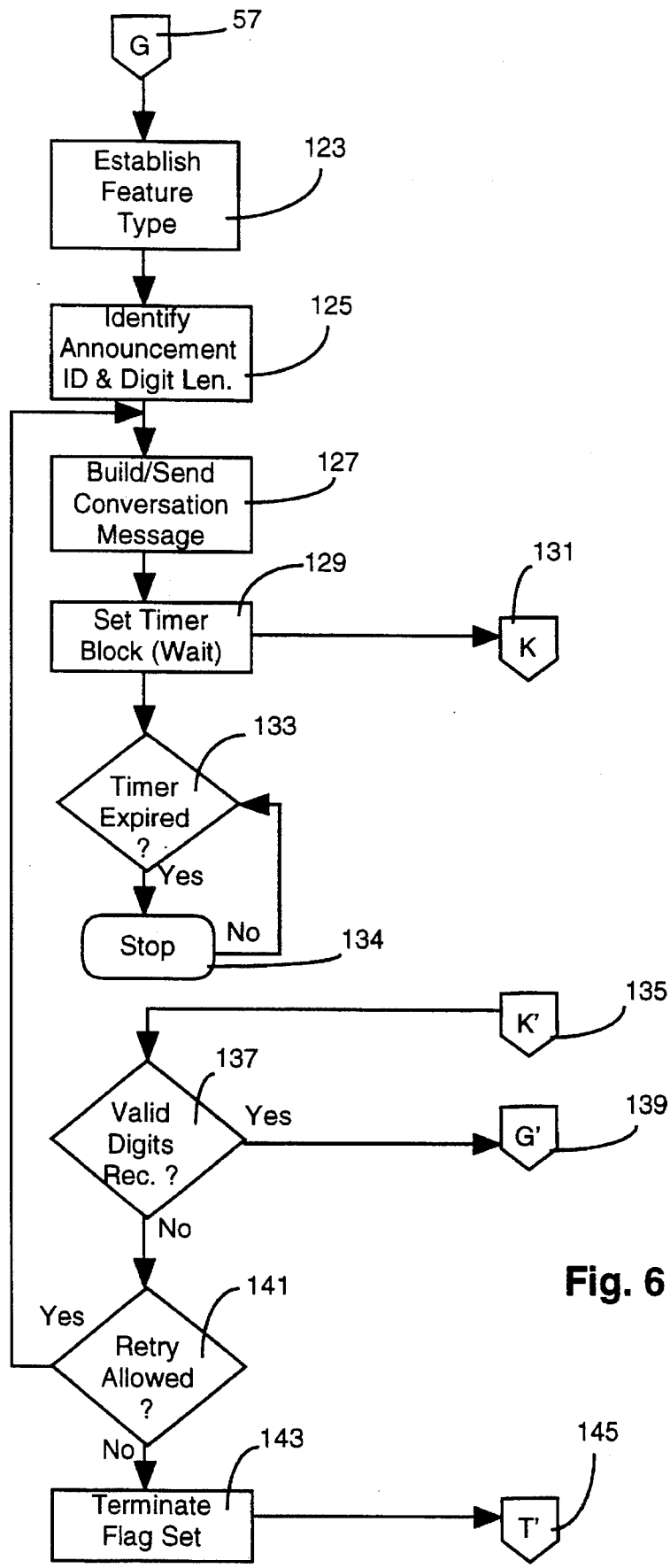
FIG. 6 is a flow diagram of a G condition of the method of FIG. 1, according to the present invention.

The method may further include verifying for vertical features 61 such as time-of-day, day-of-week etc. If such options are present, a condition B 63 shown on FIG. 6 is entered and additional steps accordingly will be required. The B condition 63 performs any additional service feature prior to muting the call.

Figure 9:
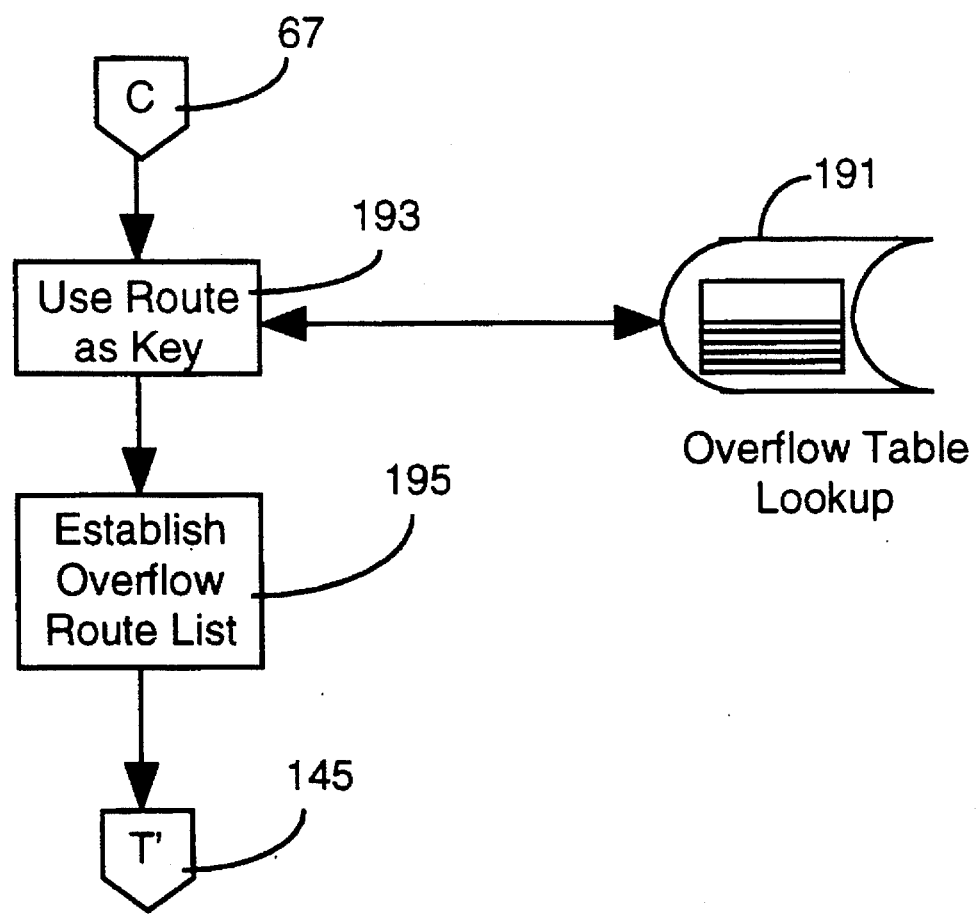
FIG. 9 is a flow diagram of a C condition of the method of FIG. 1, according to the present invention.

The method may also further verify if the customer has subscribed to overflow routing options 65, whereas additional addresses could be requested in the table lookup. If so, a condition C 67 is entered and the steps shown on FIG. 9 are performed. The C condition 67 performs any logic associated with overflow routing having established relationship to vertical features.

Figure 5:
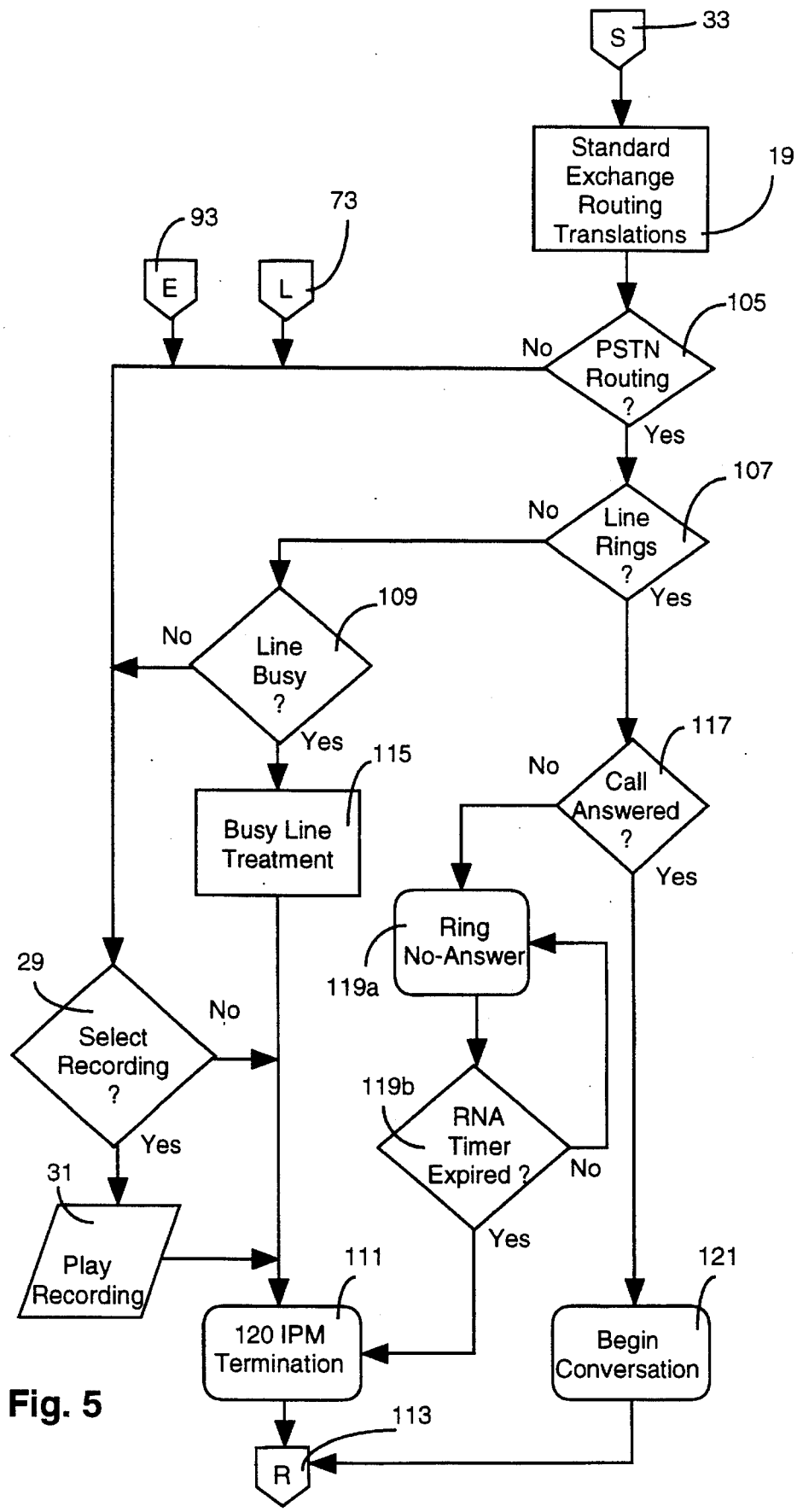
FIG. 5 is a flow diagram of an S condition of the method of FIG. 1, according to the present invention.

The method could also allow verifying of whether or not a terminate flag set has been encountered 69. If so, an annoucement is selected 71 and a condition L 73, shown on FIG. 5, is entered. When no terminate flag set has been encountered, the method pursues with the final routing number determination based on all of the abovementionned options. It is to be clearly understood that more options could be offered, and the order in which they are offered does not affect the end result.

Once the call variables have been established, the muting response message can be built, which may include any combination of allowed AIN call parameters including a termination request. Therefor, the next step consists in looking up in a table 75, based on any combination of the abovementioned features for determining a corresponding network node address, also called route. Then, the route, is assigned 77, by building the routing response which may include may combination of allowed AIN cart parameters including a termination request.

A next step could consist in assigning the corresponding billing parameters 79. The billing parameters returned could uniquely identify the features utilized throughout the call execution on the SCP so that the billing record generated at the SSP represent the pertinent rated aspects of the call.

Another step could also be performed before returning the call to the SSP. This last step would consist in internally sampling the call on the SCP in some or all cases to enable customer report generation for marketing or engineering purposes. Logged data 81 could be on a per call basis or a statistical cross-section and may include operational measurements, peg counts, caller statistics, screened attempts, call distribution, fraud attempts or any call variable or system variable pertinent to understanding aspects of the call distribution and service use. After these steps, the call enters in a condition D' 83, shown on FIG. 4, where it is returend to the SSP.

Figure 4:
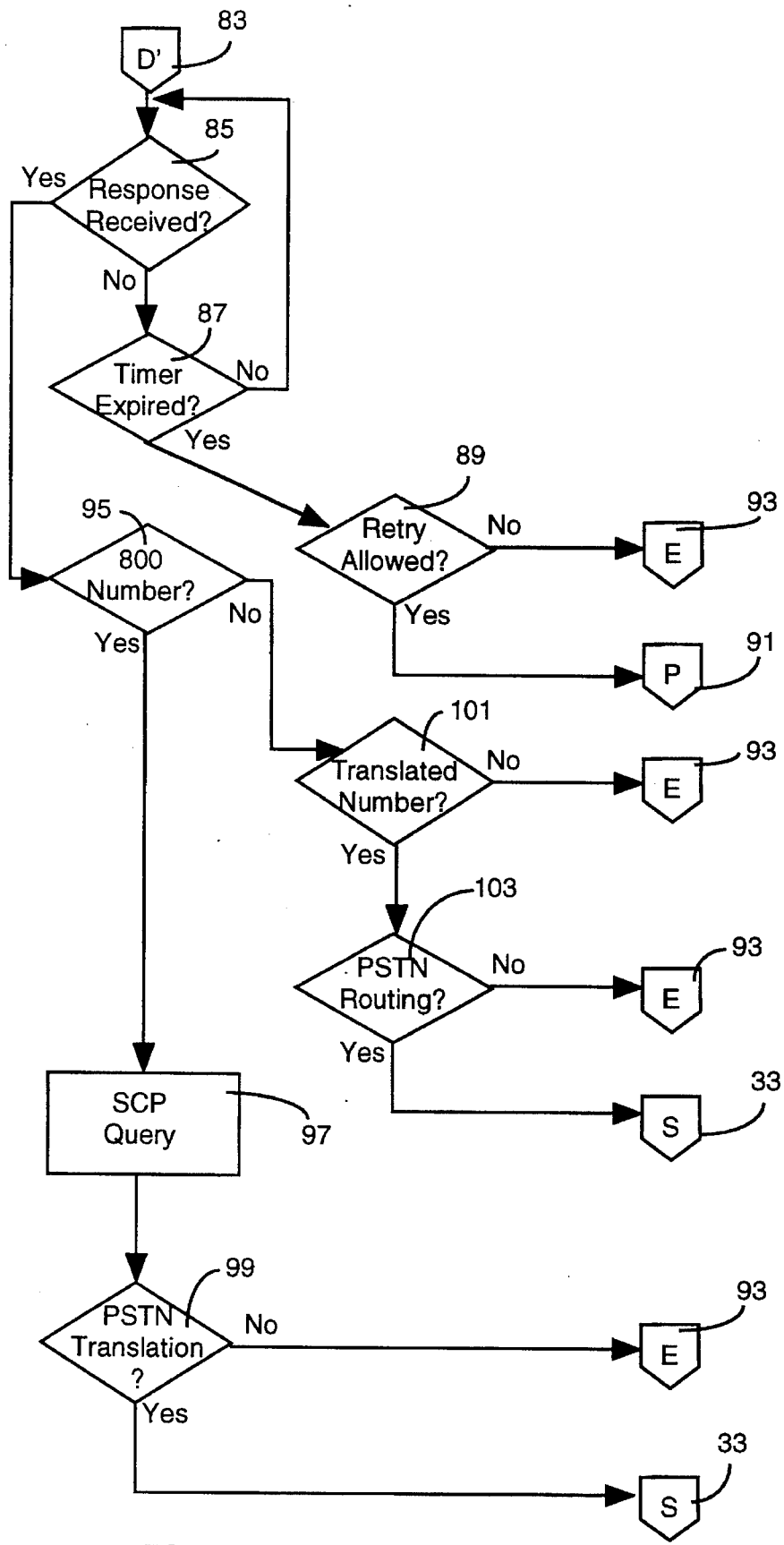
FIG. 4 is a flow diagram of a D' condition of the method of FIG. 1, according to the present invention.

Referring now to FIG. 4, there is shown the steps perfomed when in the D' condition 83. The first step in condition D' 83 consists in verifying 85 whether a response from the ISCP has been received at the SSP. If not, a timer 87 will be set. The timer sequence continues to cycle until either the timer expires, the conversation is initiated by the ISCP or a response is returned. When a response is returned prior to expiration of the timer, a number for which the SSP is capable of routig should be returned. Routing can take the form of PSTN muting or treatment for error conditions. However, if the timer comes to expiration and a response has not been received, a verification is performed for verifying whether a retry is allowed 89 or not. If a retry is flowed, a P condition 91 is entered, if not, an E condition 93 is entered. Generally, the SS7 TCAP protocol allows for one retry attempt to the ISCP per transaction. Where a second ISCP is available, the retry will be redirected. If however, the second query attempt is also unsuccessful, the call will be sent to a failure treatment ( set terminate flag).

When a response has been received, a verification is made to the response obtained to verify if it is a standard PSTN number or a Special Access Code (SAC) (e.g. 800,900,600 etc.) number 95. If the response is a SAC number 95, the call will be routed using existing SAC flows. Then, since most calls route to access exchanges with an SCP database attached, the call will be routed as an SCP query 97, and then a verification will be performed to verify that the result of this SCP query 97 is a standard PSTN translation 99. If it is a standard PSTN translation, the S condition 33 will be entered, otherwise, the E condition 93 will he entered. If the response is not a SAC number, a verification 101 is made to make sure that the response returned by the ISCP is a translated number, which meansnumber returned by the ISCP for continued network routing. If it is, a last verification 103 is made to ensure that it corresponds to the PSTN muting and if it does an S condition 33 is entered, and if not, an E condition 93 is entered.

Referring to FIG. 5, there is described the steps performed when in the S condition 33 mentionned before. This condition describes the translations used to complete the call, at the terminating office, once the routing has been determined and verified. First, the call is routed by standard switch routing translations 19. Then, a verification of the PSTN routing 105 is performed. If the PSTN routing is adequate, a verification is made to ensure that the line rings 107. Once the line rings, the call can either be answered or disconnected without an answer. Somehow, if the line does not ring, a verification is performed to see if the line is busy 109. If it is, a busy line treatment 115 is generated, a 120 impulse per minute termination tone 111 is activated and a condition R 113 is entered.

If the call cannot be completed to the destination, a call treatment shall be supplied. This treatment could be invoked by the network or directed by the ISCP. This treatment, which corresponds to conditions E 93 L 73, could comprise the following steps:

selecting a recording 29, the recording can be selected as a parameter in the TCAP response, or via standard translations;

if a recording has been selected, playing the recording 31, followed by a 120 impulse per minute termination tone 111 and entering in the R condition 113;

if a recording has not been selected, giving a busy line treatment 115, followed by the 120 impulse per minute termination tone 111 and entering in the R condition 113.

On the other hand, when the call has been routed and the line rings, a verification is performed to ensure that even if the call is not answered the line will not keep ringing for an indefinite period of time. Thus, if the call is answered 117, the conversation is allowed to begin 121 and the call enters in the T condition 113. Somehow, if the call is not answered, a ring no answer timer 119*a* is started and if the call is not answered in the meantime and the RNA timer has expired 119*b*, the 120 impulse per minute tone 111 will follow and the call will enter in the R condition 113.

Referring now to FIG. 6, there is shown there steps performed when the G condition 57 is entered. This condition is entered when a virtual public number has been dialed, and that additional digits are required, such as for the code access. This condition makes a request to the SSP to prompt and collect digits. The first step of this condition consists in establishing the feature type 123, which is a function of unique feature set of the subscriber. In fact, certain features could even require collection of several additional digits.

The next step would consist in identifying announcement, identification and digit length 125, where the feature type indicates the voice announcement and the number of digits to be collected. For example, special routing options outside of the initial dialed code could be required for personal identification number validation for screening or priority routing. Then, a conversation TCAP message would be built and sent 127 using announcement identification and digit length 125. Multiple attempts may be allowed if invallid entries are given. A timer 129 will be set for forcing a response within a prescribed time, otherwise the call will terminate with failure treatment. After sending the control message to the SSP to prompt and collect one or several more digits, which corresponds to a K condition 131, the timer synchronously ticks. If the timer expires prior to getting response, then the call terminates 134.

If while the timer 129 was ticking, a response is obtained, a K' condition 135 is entered. Then, a verification on the validity of the digits is performed 137. If the digits are valid, a G' condition 139 described on FIG. 3 is entered. This G' condition 139 returns into the flowdiagram of FIG. 3 and generates a TCAP conversation to request additional digits from the caller. But, if improper digits were entered, a retry counter 141 will manage the number of attemps allowed. Once the maximum number of attempts is exceeded, the call is terminated by setting the terminate flag 143 and entering a T' condition 145 described on FIG. 3.

Referring now to FIG. 7, there is shown the steps performed when entering in the A condition 59, which is when a virtual public number has been dialed and the customer has subscribed to call screening features. The first step consists in verifying which screening type 147 was selected by the subscriber. If a negative screening type was selected, a negative list query 149 is made. The negative list 151 is maintained and holds line identification of callers not authorized to connect to subscriber. Then, if the criteria is met 153, the calling party is not authorized to call the subscriber and the call is terminated by setting the terminate flag 157, updating the usage status 159 and entering the T' condition 145. As mentioned before, the terminate flag will indicate that the call should be terminated without feature processing. If the cam does not meet the criteria 153, an update usage status 161 is made and the condition A' 163 is entered.

If a positive screening type was selected by the subscriber, a positive list query 165 is made. The positive list 167 is maintained and holds line identification of callers authorized to connect to the subscriber. Then, if the criteria is met 169, the update usage status 161 is made and the A' condition 163 is entered. If the criteria 169 is not met, the caller is not authorized to call the subscriber and the terminate flag 157 is set, the appropriate usage status 159 is updated and the T' condition 145 is entered. The usage status flag is a running tally of the chargeable features or options that have been consumed during the call. It will be used to pass the appropriate billing information back to the SSP where a record can be generated. This aid other usage information can be logged on the SCP or a peripheral for billing or reporting purposes.

Figure 8:
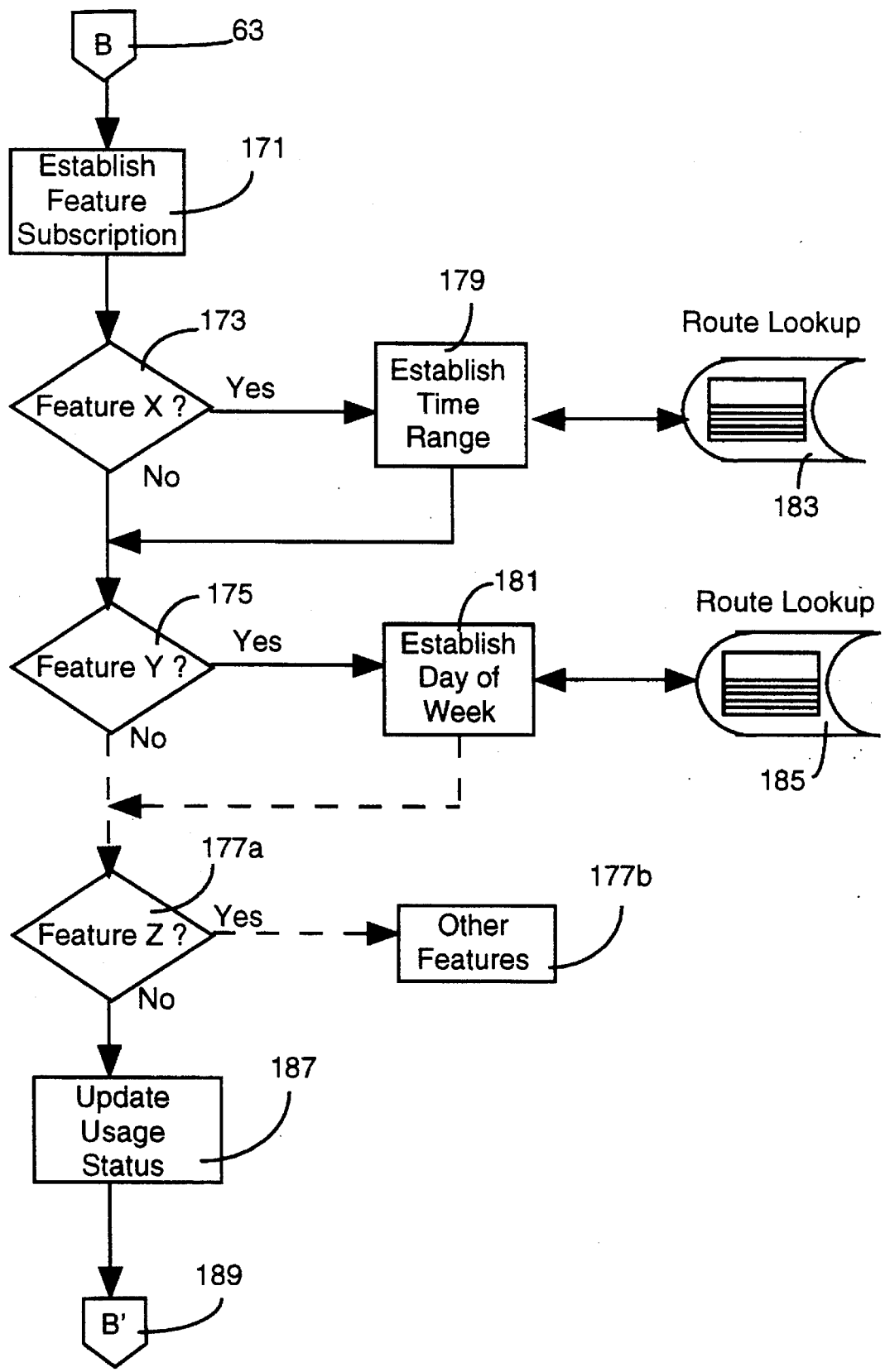
FIG. 8 is a flow diagram of a B condition of the method of FIG. 1, according to the present invention.

Referring now to FIG. 8, there is described the steps performed in the B condition 63, which is entered when a virtual public number has been dialed and the subscriber has selected vertical features. The first step consist of establishing the feature subscription 171. The SCP would maintain a feature list of those features subscribed to by the subscriber. The features would not necessarily be mutually exclusive and interaction between vertical features could exist, even though not shown on this flow diagram.

The next steps would consist of determining which features X, Y, Z are subscribed 173. An example of a vertical feature is time of day routing. In this case, the subscriber could have any code destinations route to alternate addresses depending on the time of the day. Time ranges would exist and subscribers would provision a schedule for each code and the associated routing address. If a feature has been selected, verification 175 would be performed to verify if the call is within the established range by referring to corresponding table 183. Thus, the subscribers features would be executed 177 and when complete, the output would be a routing number for that particular call, as well as any usage or billing status updates as a result of feature consumption. Then, an update usage status 187 would be performed and a condition B' 189, shown on FIG. 3, would be entered. The usage status flag is a running tally of the chargeable features or options that have been consumed dureing the call. It would be used to pass the appropriate billing information back to the SSP where a record can be generated. This and other usage information can be logged on the SCP or a peripheral for billing or reporting purposes in addition to any record generation in the PSTN.

Referring now to FIG. 9, there is shown the steps performed when the condition C 67 is entered. This condition is entered when a virtual public number has been identified and when the subscriber has selected overflow routing option. Then, an overflow table lookup 191 is provisioned to contain numerous overflow routing addresses or trunks for overflow muting by the SSP. The first step consists in using the route number as a key 193 to obtain the list of overflow routes or trunks from the online database residing on the SCP or adjunct of the overflow lookup table 191. From this lookup, an overflow route list is established 195 and the T' condition 145 is entered.

Figure 10:
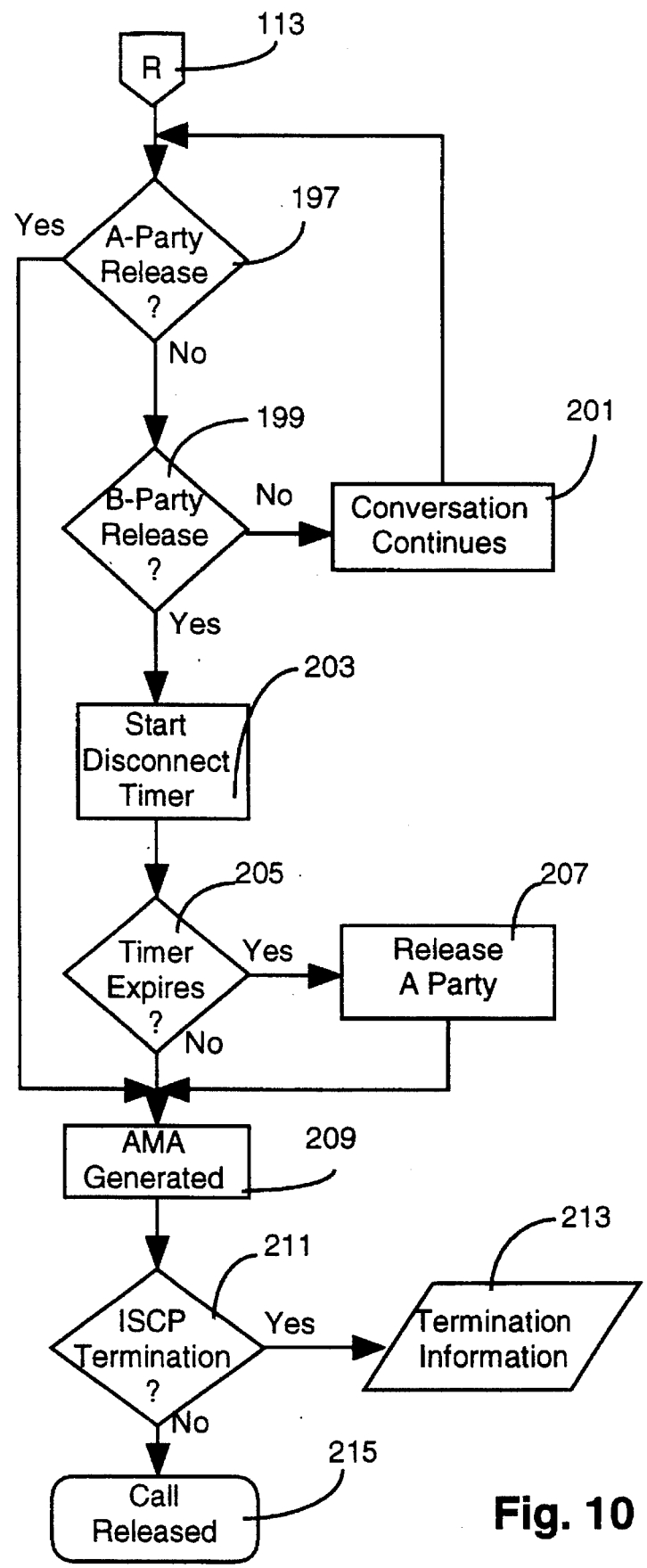
FIG. 10 is a flow diagram of an R condition of the method of FIG. 1, according to the present invention.

Referring to FIG. 10, there is the R condition 113 is entered. This condition describes the steps performed for realizing standard call release sequence. This procedure is identical to the disconnect of any other type of call. The only deviation is where notification is required by the ISCP. The first step consists in verifying whether A party releases call 197, and if not, verifying whether a B party releases the call 199 and if not, the conversation continues 201. If the B pan releases the call first, disconnect timer is started 203. Once the disconnect timer expires 205, the A party is releases and an Automatic Message Accounting is generated 209. When the A party releases the call first, the Automatic Message Accounting is generated 209. This message is useful for billing information and billing parameters are contained in the TCAP response message. After the Automatic Accounting 209, if notification to the ISCP of call termination is required 211, a termination informations are sent 213, otherwise the call is released 215. Under certain conditions, it is sometimes necessary to provide notification to the ISCP of call termination. A TCAP termination message is then generated. Although the SSP controls the generation of this TCAP message, it is usually directed by the ISCP during conversation or with response.

Figure 11:
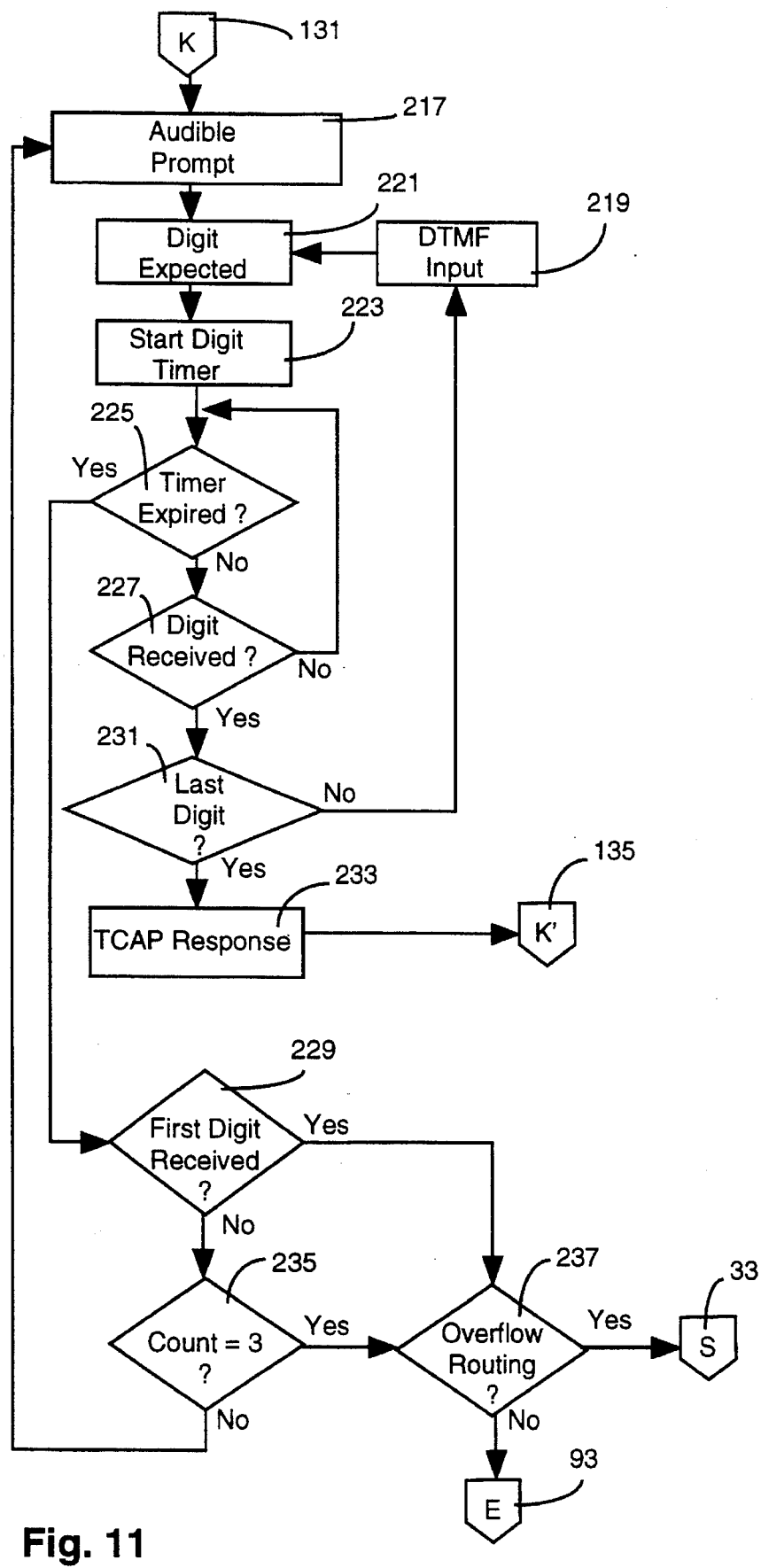
FIG. 11 is a flow diagram of a K condition of the method of FIG. 1, according to the present invention.

Referring now to FIG. 11, there is shown the steps performed when the K condition 131 is entered. The first step consists in generating an audible prompt 217 to indicate to the caller that more digits must be provided. Then service exchange attaches tone detection equipment on the circuit waiting for DTMF input from the caller 219. When the caller inputs the digit expected 221, a start digit timer 223 is started. If the start digit timer is not expired 225 and the digit 227 has not been received, the call stays in a loop. Until a digit is received, the call will continuously check the timer status 225 to determine if the timer has expired. When in that loop, from the moment a digit is received 227, a verification 231 as to whether the digit received is the last is performed. If it is not the last digit, the call returns to the digit expected 221. The request for further digits from the ISCP indicates the number of digits to expect. Until the last digit has been received, the service exchange waits for the next digit. Once the final digit is confirmed, a TCAP response 233 is generated and a K' condition 135 is entered where the digits are forwarded to the ISCP to allow the call to proceed to the next stage in call sequence. When the serving exchange has not detected the receipt of any supplementary digits, the audible prompt 217 will be replayed, up to 3 times, these 3 times being calculated by the counter 235. If on the third time no digits are detected, the call will then proceed to a verification for overflow muting 237, and if overflow routing is possible the call will enter in the S condition 33, otherwise it will enter the E condition 93.

If a particular SSP or switch does not have # capability, it is proposed that the call using the # as dialled digits is directed to a #=capable SSP and that the dialled digits, including the #, are passed in the ISUP message to the capable switch. If the # cannot be passed in the digits field of the ISUP message, a unique digit sequence must be passed in its place or, special trunks could be used that indicate to the receiving #-capable switch that it is a # call.

This method of muting a call to a number either on a virtual public dial plan or on an exisiting dial plan opens the possibility of a myriad of new services, many already conceptualized but not technically practical. Services such as Code Access (described herein), flexible vanity dialling etc.

Figure 2:
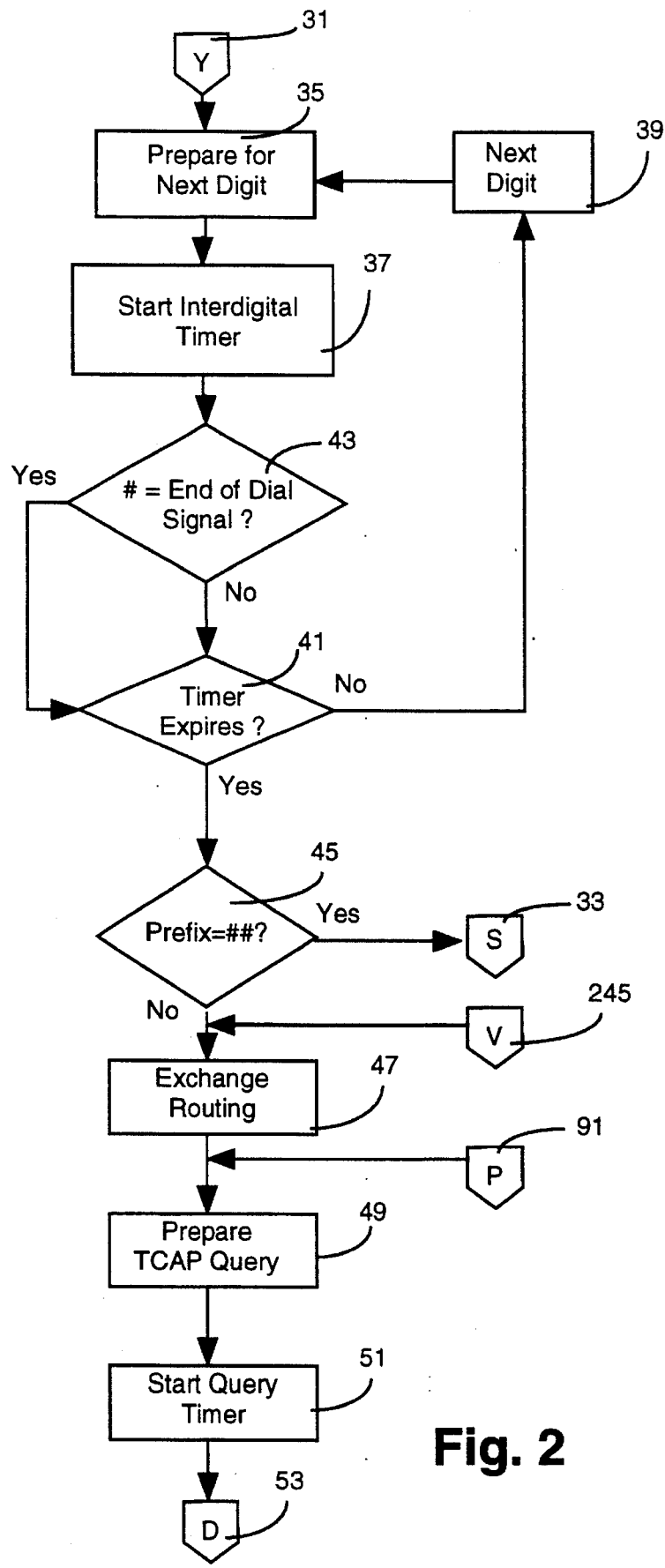
FIG. 2 is a flow diagram of a Y condition of the method of FIG. 1, according to the present invention.
Figure 13:
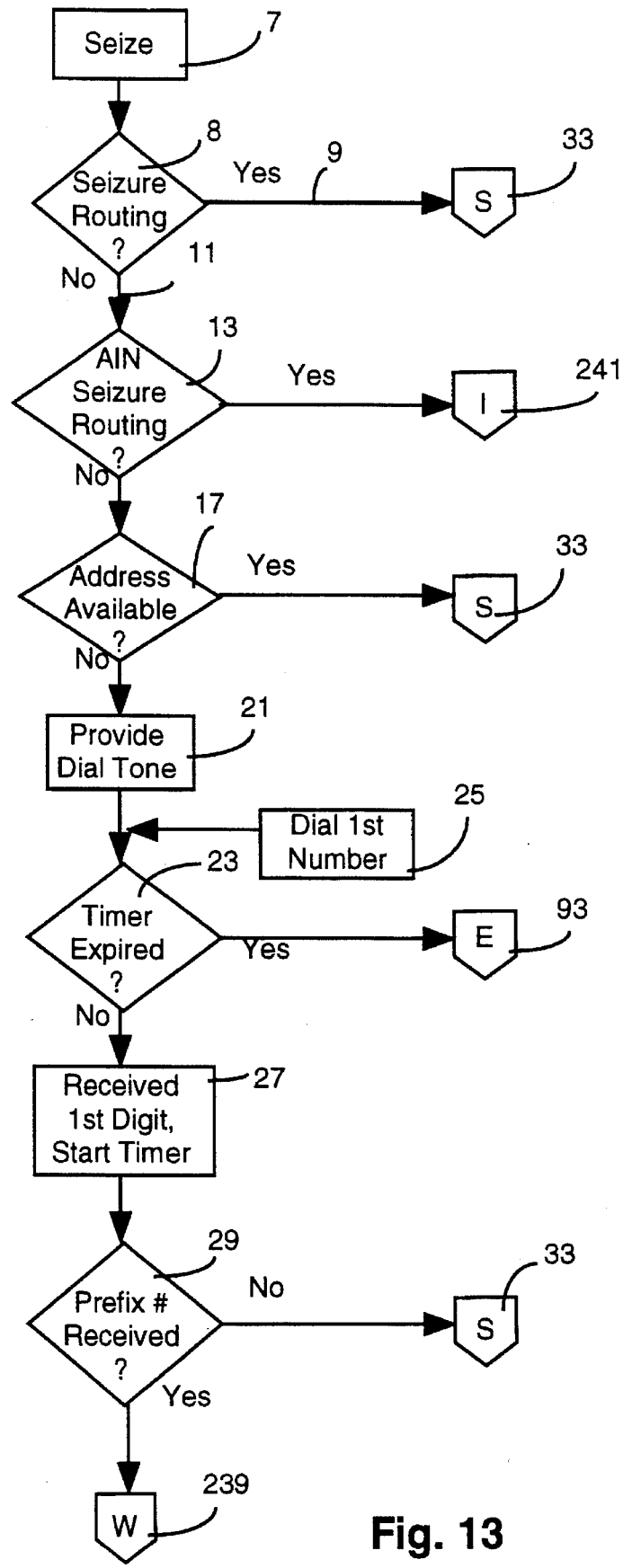
FIG. 13 is a flow diagram of a second preferred embodiment of the method for routing a call to a number corresponding either to a virtual public dial plan or to an existing dial plan, according to the present invention.
Figure 14:
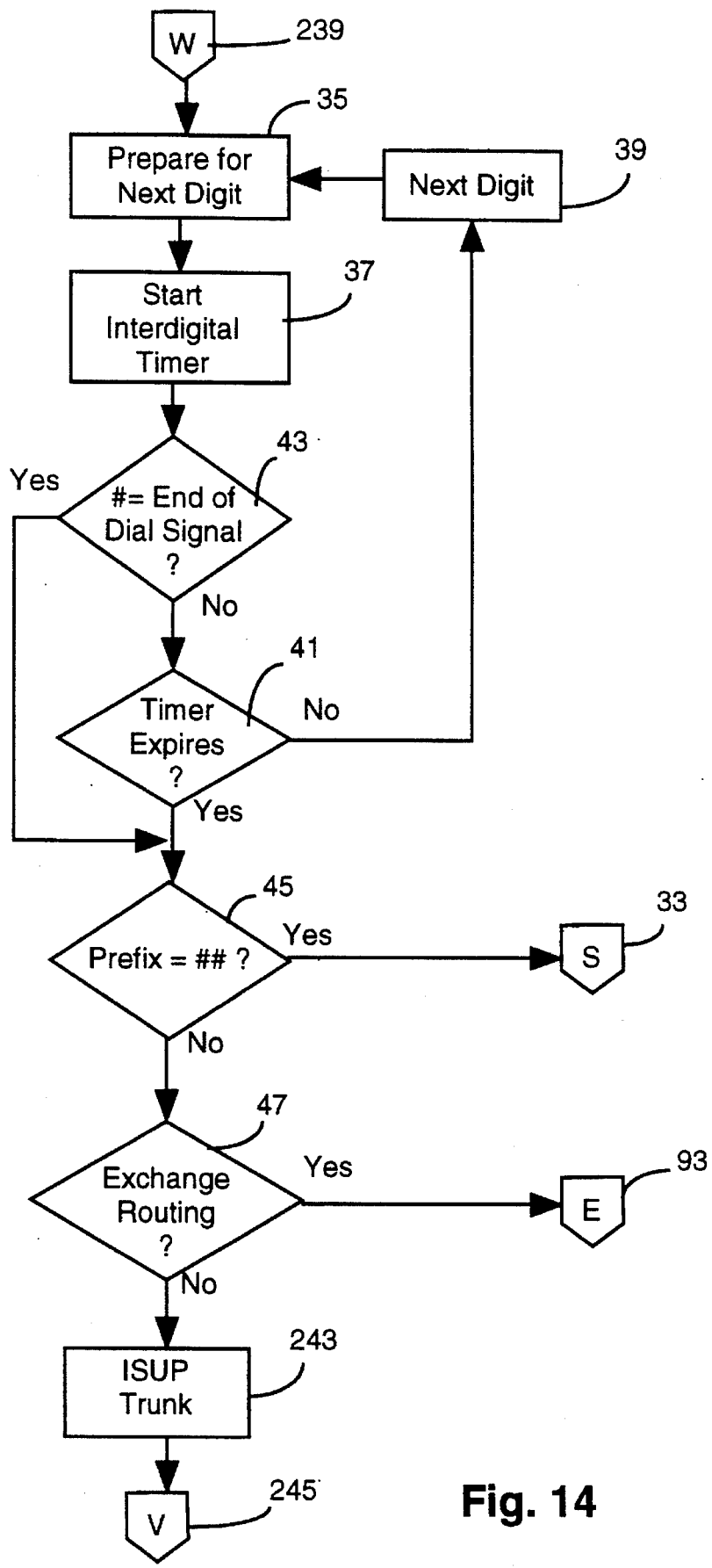
FIG. 14 is a flow diagram of a W condition of the method of FIG. 13.

Referring now to FIGS. 13 and 14, there is shown a second preferred embodiment for the flow diagrams of FIGS. 1 and 2 respectively. This second preferred embodiment refers to AIN connectivity via ISUP. For performing fills type of connectivity, certain modifications have to be made. On FIG. 13, if the AIN seizure routing 13 is positive, the condition entered is an I condition 241. Secondly, the condition entered when # has been received as first digit 29 is condition W 239. This means that the call will route to an ISUP trunk to connect to the AIN serving SSP. All other digits will be routed using the existing dial plan. Then, on FIG. 14, the entering condition is the W condition 239. Finally, when exchange routing 47 to AIN capable SSPs is available, exchange translations will route the call to an ISUP trunk 243 and a V condition 245 will be entered.

Figure 12:
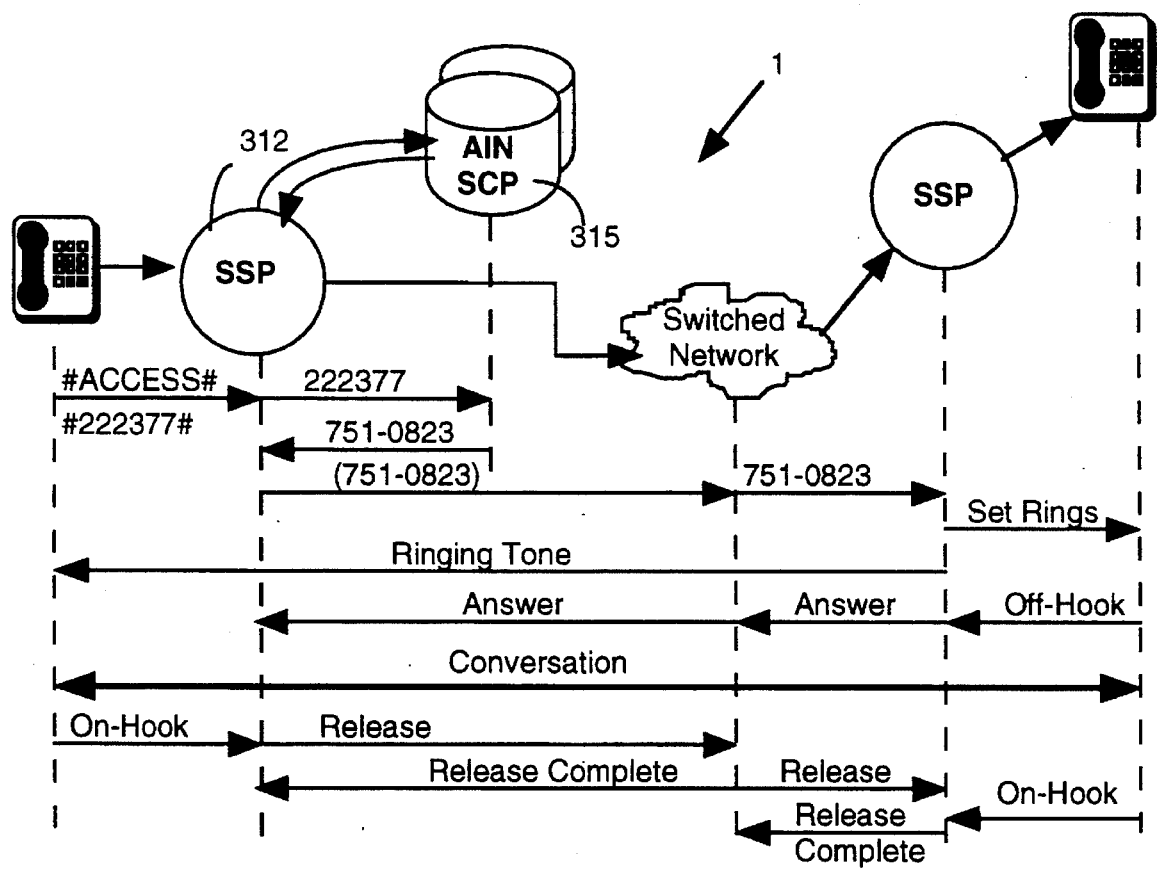
FIG. 12 is a block diagram of an apparatus according to the present invention.

Referring now to FIG. 12, there is shown an apparatus for routing a call to a number having either virtual public address or network node address through an existing telephone network infrastructure 1. The telephone network infrastructure 1 comprises digital switching points 312 and a database system 315. The apparatus comprises receiving mean, for receiving at one of the digital switching points a number called and verifying means for verifying whether the number called received by the receiving means is a number of the virtual public dial plan. The apparatus further comprises forming means for forming with the number called a virtual public address of predetermined length and a first supplying means for supplying the virtual public address to the database system. The receiving means, verifying means, forming means and supplying means may all be pan of each of the digital switching points 312.

The apparatus also comprises determining means for determining a corresponding network node address, second supplying means for supplying the corresponding network node address to the digital switching point and routing means for routing the call through the network infrastructure. Preferably, the determining means and the second supplying means are part of the database system 315, while the routing means is part of the digital switching point 312.

The proposed method and apparatus are a combination of a unique switch translations and the # key being used in a new way, which is as a mechanism to route to the PODP trigger, combined with AIN being used in a way not considered before to allow for the universe of callers and a unique service based on the dialled number.

Although the present invention has been explained hereinabove by way of preferred embodiments thereof, it should be pointed out that any modifications to these preferred embodiments, within the scope of the appended claims, are not deemed to change or alter the nature and scope of the present invention.

What is claimed is:

1. In a telephone network having a number of telephone switching offices equipped with SSPs (Service Switching Points) operating with AIN (Advanced Intelligent Network) application software, and a remotely located SCP (Service Control Point) adapted to receive, when required, SS7 (Signalling System 7) messages from the SSPs to translate a dialed number to enable the routing of a call on the telephone network, a method of providing a parallel, non-intrusive virtual public dial plan (VPDP), co-existing with the current network North American numbering plan (NANP), to enable a calling party to dial a virtual, public telephone number without the dialing limitations of the NANP, comprising the steps of:

a) providing a VPDP access code which, when dialed as a prefix to the virtual, public telephone number, enables a calling party, to reach a destination station via the VPDP;

b) setting up an AIN trigger at AIN capable SSPs, said AIN trigger being responsive to said VPDP access code;

c) launching a query from said AIN capable SSPs to said remotely located SCP when said AIN trigger detects a VPDP access code; and d) providing a VPDP to NANP translation table at the SCP, such that when the virtual, public telephone number dialed by the calling party is received at the SCP, the dialed number can be translated to a NANP telephone number for routing to the destination station.

2. A method as defined in claim 1, wherein the step of launching a query from said AIN capable SSPs further comprises the steps of:
  i) forming, at said SSP, an SS7 message comprising the dialed virtual, public telephone number;
  ii) sending the SS7 message from said SSP to said SCP along a common signaling channel;
  iii) receiving the SS7 message at said SCP;
  iv) translating the virtual, public telephone number in the SS7 message to a routing number corresponding to a telephone number associated with the NANP; and
  v) sending a response SS7 message from said SCP to said SSP, said SS7 message containing said routing number, such that the call can be routed to said destination station.

3. A method as defined in claim 2, wherein the AIN trigger is a Public Office Dial Plan trigger.

4. A method as defined in claim 2, wherein the AIN trigger is a customized dial plan trigger.

5. A method as defined in claim 2, wherein the VPDP access code is deleted prior to forming the SS7 message.

6. A method as defined in claim 5, wherein the VPDP access code is a character not used in the NANP.

7. A method as defined in claim 6, wherein the VPDP access code is the number (#) sign.

8. A method as defined in claim 2, wherein calls having a VPDP access code, and which originate from a non-AIN capable switch are forwarded to an AIN capable SSP in order to query said SCP.

9. A method as defined in claim 8, wherein calls from non-AIN capable switches are forwarded to said AIN capable SSP, via an ISUP (Integrated Services Digital Network User Port) message containing a code indicative that the dialed number is directed to the VPDP.

10. A method as defined in claim 9, wherein calls from non-AIN capable switches are forwarded to said AIN capable SSP, via a dedicated trunk connecting the non-AIN capable switches and said AIN capable SSP.

11. A method as defined in claim 9, wherein calls from non-AIN capable switches are forwarded to said AIN capable SSP, via an ISUP parameter contained in said ISUP message.

12. In a telephone network having a number of telephone switching offices equipped with SSPs (Service Switching Points) operating with AIN (Advanced Intelligent Network) application software, and a remotely located SCP(Service Control Point) adapted to receive, when required, SS7 (Signalling System 7) messages from the SSPs to translate a dialed number to enable the routing of a call on the telephone network, a method of routing a call according to a telephone number selected from a parallel, non-intrusive virtual public dial plan (VPDP), co-existing with the current network node address numbering plan, comprising the steps of:
  a) receiving at one of the SSPs a series of DTMF codes including a dialed number;
  b) determining whether the DTMF codes received include a VPDP access code, indicating that the dialed number is to be routed according to said VPDP; if the digits received include a VPDP access code:
    i) forming, at said SSP, an SS7 message comprising the dialed VPDP number;
    ii) sending the SS7 message from said SSP to said SCP along a common signaling channel;
    iii) receiving the SS7 message at said SCP;
    iv) translating the VPDP number in the SS7 message to a routing number corresponding to a telephone number associated with said existing network node address numbering plan; and
    v) sending a response SS7 message from said SCP to said SSP, said SS7 message containing said routing number, such that the call can be routed on said telephone network; and
  c) routing the call according to the current network node address numbering plan if the received DTMF codes do not include the VPDP Access Code.

13. A method as defined in claim 12, wherein the step of determining comprises:
  verifying whether the number dialed in step (a) is preceded by a predetermined prefix code indicative that the call is to be routed via the VPDP.

14. A method as defined in claim 13, wherein the predetermined prefix code is used as an AIN trigger to instruct the SSP to form an SS7 message for sending to the SCP.

15. A method as defined in claim 14, wherein the AIN trigger is a Public Office Dial Plan trigger.

16. A method as defined in claim 14, wherein the AIN trigger is a customized dial plan trigger.

17. A method as defined in claim 14, wherein the predetermined prefix code is deleted prior to forming the SS7 message.

18. A method as defined in claim 17, wherein the predetermined prefix code is a character not used in the network node address numbering plan.

19. A method as defined in claim 18, wherein the predetermined prefix code is the number (#) sign.

20. A method as defined in claim 12, wherein calls directed to the VPDP, and which originate from a non-AIN capable switch are forwarded to an AIN capable SSP in order to query said SCP.

21. A method as defined in claim 20, wherein calls from non-AIN capable switches are forwarded to said AIN capable SSP, via an ISUP (Integrated Services Digital Network User Port) message containing a code indicative that the dialed number is directed to the VPDP.

22. A method as defined in claim 20, wherein calls from non-AIN capable switches are forwarded to said AIN capable SSP, via a dedicated trunk connecting the non-AIN capable switches and said AIN capable SSP.

23. A method as defined in claim 20, wherein calls from non-AIN capable switches are forwarded to said AIN capable SSP, via an ISUP parameter contained in an ISUP message.

24. A method as defined in claim 12, further comprising the step of verifying whether a customized code indicative of a predetermined subscriber station is appended to said dialed number.

25. A method as defined in claim 24, wherein said customized code can be used to differentiate a first subscriber station from a second subscriber station.

26. In a telephone network having a number of telephone switching offices equipped with SSPs (Service Switching Points) operating with AIN (Advanced Intelligent Network) application software, and a remotely located SCP(Service Control Point) adapted to receive, when required, SS7 (Signalling System 7) messages from the SSPs to translate a dialed number to enable the routing of a call on the telephone network, a system for routing a call according to a telephone number selected from a parallel, non-intrusive virtual public dial plan (VPDP), co-existing with the current network node address numbering plan, comprising:
  a) a first SSP for receiving a series of DTMF codes including a dialed number;
  b) means, at said SSP, for determining whether the DTMF codes received include a virtual public dial plan access code, indicating that the dialed number is to be routed according to said VPDP;

c) means for forming, at said SSP, an SS7 message comprising the dialed VPDP number, if the digits received include a VPDP access code;

d) an SCP for receiving said SS7 message from said SSP along a common signaling channel; and e) means for translating the VPDP number in the SS7 message to a routing number corresponding to a telephone number associated with said existing network node address numbering plan such that the call can be routed on said telephone network.

27. A system as defined in claim 26, wherein said virtual public dial plan access code comprises a predetermined prefix code indicative that the call is to be routed via the VPDP.

28. A system as defined in claim 27, wherein the predetermined prefix code is used as an AIN trigger to instruct the SSP to form an SS7 message for sending to the SCP.

29. A system as defined in claim 28, wherein the AIN trigger is a Public Office Dial Plan trigger.

30. A system as defined in claim 28, wherein the AIN trigger is a customized dial plan trigger.

31. A system as defined in claim 28, wherein the predetermined prefix code is deleted prior to forming the SS7 message.

32. A system as defined in claim 31, wherein the predetermined prefix code is a character not used in the network node address numbering plan.

33. A system as defined in claim 32, wherein the predetermined prefix code is the number (#) sign.

* * * * *

UNITED STATES PATENT AND TRADEMARK OFFICE
CERTIFICATE OF CORRECTION

PATENT NO. : 5,583,926           Page 1 of 4
DATED : December 10, 1996
INVENTOR(S) : Daniel J. VENIER et al.

It is certified that error appears in the above-indentified patent and that said Letters Patent is hereby corrected as shown below:

On drawing sheet, note that Figure 1, reference "173" should be amended to --73--; and the output from decision block "17" should be labelled --No--.

Column 1, line 17, contains typographical errors wherein "fled" should read --tied--; line 28, "Dialing" should read --Dialling--; line 35, "wig" should read --within--; line 36, "Adavanced" should read --Advanced--; lines 38 and 40, "metropolitain" should read --metropolitan--; line 43, "dialing" should read --dialling--; line 45, "explicity" should read --explicit--; line 53, "Dialing" should read --Dialling--; line 54, "dialing" should read --dialling--; and line 67 insert --.-- after "0.2".

Column 2, lines 5 and 11, "dialing" should read --dialling--; lines 23, 24, 35, 49 and 57, "dialed" should read --dialled--; line 30, "muting" should read --routing--; line 36, "Dialed" should read --Dialled--; and line 43, "lauched" should read --launched--.

UNITED STATES PATENT AND TRADEMARK OFFICE
CERTIFICATE OF CORRECTION

PATENT NO.   :   5,583,926
DATED        :   December 10, 1996
INVENTOR(S)  :   Daniel J. VENIER et al.

It is certified that error appears in the above-indentified patent and that said Letters Patent is hereby corrected as shown below:

Column 3, line 26, "abovementionned" should read --abovementioned--.

Column 5, line 1, "dialing" should read --dialling--; line 12, "stone" should read --same--; line 16, "to verifying" should read --to verify--; line 31, "told" should read --and--; and line 48, "axle" should read --code--.

Column 6, line 25, "dialed" should read --dialled--; line 34, "priced" should read --proceed--; line 42, "dialing" should read --dialling--; line 55, "BODP" should read --PODP--; line 57, "flowdiagram" should read --flow diagram--; and line 62, "diddled" should read --dialled--.

Column 7, line 3, "TCAB" should read --TCAP--; line 49, "Therefor" should read --Therefore--; and line 54, "cart" should read --call--.

UNITED STATES PATENT AND TRADEMARK OFFICE
CERTIFICATE OF CORRECTION

PATENT NO. : 5,583,926
DATED : December 10, 1996
INVENTOR(S) : Daniel J. VENIER et al.

It is certified that error appears in the above-indentified patent and that said Letters Patent is hereby corrected as shown below:

Column 8, line 4, "returend" should read --returned--; line 14, "routig" should read --routing--; line 15, "muting" should read --routing; line 18, "flowed" should read --allowed--; line 38, "meansnumber" should read --means number--; and line 41, "muting" should read --routing--.

Column 9, lines 16, 27 and 52, "dialed" should read --dialled--; line 31, "invallid" should read --invalid--; and line 43, "flowdiagram" should read --flow diagram--.

Column 10, line 11, "aid" should read --and--; line 16, "dialed" should read --dialled--; line 17, "consist" should read --consists--; line 26, "route" should read --routed--; line 39, "dureing" should read --during--; line 51, "muting" should read --routing--; line 64, "pan" should read --party--; and line 66, "releases" should read --released--.

UNITED STATES PATENT AND TRADEMARK OFFICE
CERTIFICATE OF CORRECTION

PATENT NO. : 5,583,926
DATED : December 10, 1996
INVENTOR(S) : Daniel J. VENIER et al.

It is certified that error appears in the above-indentified patent and that said Letters Patent is hereby corrected as shown below:

Column 11, line 6, "a termination informations are" should read --termination information is--; line 38, "muting" should read --routing--; line 49, "muting" should read --routing--; and line 59, "fills" should read --this--.

Column 12, line 9, delete "," after "mean"; line 27, "translations" should read --translation--; lines 45, 52, 61, and 65, "dialed" should read --dialled--; and line 50, "dialing" should read --dialling--.

Column 13, line 5, 34, 49, 56, 58 and 62, "dialed" should read --dialled--.

Column 14, lines 12, 38, 49, 59 and 65, "dialed" should read --dialled--.

Column 15, lines 1, and 4, "dialed" should read --dialled--.

Signed and Sealed this

Fifteenth Day of July, 1997

*Attest:*

BRUCE LEHMAN

*Attesting Officer*  Commissioner of Patents and Trademarks